(12) United States Patent
Ransijn

(10) Patent No.: US 9,118,511 B1
(45) Date of Patent: Aug. 25, 2015

(54) REFLECTIVE ANALOG FINITE IMPULSE RESPONSE FILTER

(71) Applicant: PMC-Sierra US, Inc., Sunnyvale, CA (US)

(72) Inventor: Johannes G. Ransijn, Wyomissing Hills, PA (US)

(73) Assignee: PMC-Sierra US, Inc., Sunnyvale, CA (US)

(*) Notice: Subject to any disclaimer, the term of this patent is extended or adjusted under 35 U.S.C. 154(b) by 29 days.

(21) Appl. No.: 14/049,440

(22) Filed: Oct. 9, 2013

(51) Int. Cl.
| | | |
|---|---|---|
| *H03H 7/30* | (2006.01) |
| *H04B 3/04* | (2006.01) |
| *H04L 27/01* | (2006.01) |
| *H04B 3/14* | (2006.01) |

(52) U.S. Cl.
CPC .............. *H04L 27/01* (2013.01); *H04B 3/145* (2013.01)

(58) Field of Classification Search
CPC .................. H04L 25/03057; H04L 25/03038; H04L 25/03885; H04L 25/03159; H04L 2025/0349; H04L 27/368; H04L 25/03343; H04L 2025/03414; H04L 25/03133; H04L 25/0272; H03F 1/3247; H03F 1/3294; H03F 2201/3233; H04B 1/1036; H04B 3/141; H04B 3/04; H04B 3/145; H04B 3/14; H04B 1/0007; H04B 1/10; H04B 1/0475; H04B 3/144; H03H 17/06; H01P 9/003
USPC ......... 375/229, 256, 259, 295, 296, 316, 346, 375/350; 333/18, 28 R
See application file for complete search history.

(56) References Cited

U.S. PATENT DOCUMENTS

| | | | | |
|---|---|---|---|---|
| 4,635,143 A | * | 1/1987 | Suzuki et al. ................... | 360/65 |
| 4,661,789 A | | 4/1987 | Rauscher | |
| 4,786,989 A | * | 11/1988 | Okamura et al. ............... | 360/65 |
| 7,446,622 B2 | * | 11/2008 | Chiang ........................... | 333/18 |
| 7,498,883 B2 | * | 3/2009 | Wu et al. ........................ | 330/286 |
| 8,311,168 B2 | | 11/2012 | Kim et al. | |
| 8,335,249 B1 | * | 12/2012 | Su et al. ......................... | 375/232 |
| 2004/0196085 A1 | * | 10/2004 | Shen .............................. | 327/277 |
| 2005/0052255 A1 | * | 3/2005 | Chiang ........................... | 333/18 |
| 2010/0027609 A1 | | 2/2010 | Wada | |
| 2010/0040180 A1 | * | 2/2010 | Kim et al. ...................... | 375/348 |

FOREIGN PATENT DOCUMENTS

WO    WO 2004/008782    *    1/2004

OTHER PUBLICATIONS

Jutzi, "Microwave Bandwidth Active Transversal Filter Concept with MESFETs," IEEE Transactions on Microwave Theory and Techniques, vol. MTT-19, No. 9, Sep. 1971, pp. 760-767.

(Continued)

*Primary Examiner* — Tesfaldet Bocure
(74) *Attorney, Agent, or Firm* — Dennis R. Haszko

(57) ABSTRACT

A distributed Analog Finite Impulse Response (AFIR) filter circuit with n physical taps provides an output equivalent to an AFIR filter circuit with 2n−1 taps by emulating n−1 taps. An impedance mismatch, with respect to the characteristic impedance of the input and output transmission lines, is imposed at the input and output terminals to take advantage of the resulting reflective signal paths, which emulate the additional taps. This implementation results in space-savings and power-savings for on-chip implementations of the circuit. Implementations disclosed herein are advantageous in telecommunication applications that rely heavily on copper/FR4 backplanes in serial data links.

15 Claims, 16 Drawing Sheets

(56) References Cited

OTHER PUBLICATIONS

Enning et al., "Matched Filter for Broadband Application Using the Counterpropagating Output of a Distributed Amplifier," IEEE Transactions on Circuits and Systems-II: Analog and Digital Signal Processing, vol. 42, No. 7, Jul. 1995, p. 502, 503.

Pavan et al., "Nonidealities in Traveling Wave and Transversal FIR Filters Operating at Microwave Frequencies," IEEE Transactions on Circuits and Systems-I: Regular Papers, vol. 53, No. 1, Jan. 2006, pp. 177-192.

Ng et al., "A 38-Gb/s 2-tap Transversal Equalizer in 0.13-µm CMOS using a Microstrip Delay Element," IEEE RFIC Symposium, Atlanta, GA, Jun. 2008, 4 pages.

* cited by examiner

REFLECTIVE ANALOG FINITE IMPULSE RESPONSE FILTER

FIELD

The present disclosure relates generally to the use of analog equalizers inside data communication receivers. More particularly, the present disclosure relates to an area-efficient on-chip implementation of an equalizer commonly used in high speed data communication receivers.

BACKGROUND

The ever increasing demand for low-cost, low-complexity yet high-reliability transmission media in high-speed data communication devices results in a heavy reliance on copper/FR4 backplanes in serial data links. Consequently, transmission systems need to compensate for significant frequency-dependent channel losses that result from skin effect and dielectric loss in the copper traces and impedance discontinuities at the board/connector interfaces.

To equalize the channel loss in receivers operating at relatively low, i.e. less than 1 Gb/s, data transmission speed equalization of channel losses is performed in the digital domain using Finite Impulse Response (FIR) filters.

However, for receivers operating at high, i.e. multi-Gb/s, data transmission rates analog to digital converters (ADC) with sufficient speed and resolution are difficult to implement. Moreover, power consumption for such high speed ADCs and digital signal processors (DSP) can become prohibitive. Thus, equalization is more efficiently performed in the analog domain.

Analog FIR filters are continuous-time implementations of FIR filters and have gained popularity in applications that make use of higher data transmission rates as an alternative to conventional zero/pole peaking circuits, mainly because of their superior flexibility.

At data transmission rates beyond 10 Gb/s it becomes difficult to implement the delay elements in the AFIR filter because the delays required are on the order of intrinsic circuit propagation delays. For this reason distributed techniques are employed, using the propagation delays of on-chip transmission line sections that offer the additional advantage of being able to absorb circuit parasitics with inductive elements, thus extending the achievable circuit bandwidth.

The time-domain response of a 3-tap AFIR filter is given by the equation:

$$V_o(t) = V_i(t) \cdot a_1 + V_i(t-\tau) \cdot a_2 + V_i(t-2\tau) \cdot a_3 \quad (1)$$

Where, $$a_k = g_k \frac{R}{2} \quad (2)$$

$\tau$ represents the time delay in the delay elements of the circuit;
$V_o$ represents the output signal;
$V_i$ represents the input signal;
t represents time; and
$a_k$ represents the FIR coefficients as implemented by amplifiers.

FIG. 1 illustrates a conventional 3-tap implementation for an AFIR filter 150 with three taps connected by four transmission line sections and two termination resistors. Note that the resistance value of the input termination resistor 121 and the output termination resistor 122 are each chosen to match the characteristic impedance of their respective transmission lines. The input transmission line comprises transmission line sections 141 and 142. The output transmission line comprises transmission line sections 143 and 144. Although the input and output transmission lines can have different characteristic impedances, for the sake of simplicity it is assumed here that they are both equal to R. Those skilled in the art can easily apply the following description to the case where input and output lines are used that have different characteristic impedances. The first tap 131 comprises a transconductance amplifier with gain $g_1$ 171. The second tap 132 comprises a transconductance amplifier with gain $g_2$ 172. The third tap 133 comprises a transconductance amplifier with gain $g_3$ 173. The first tap is connected to the second tap via transmission lines 141 and 143. The third tap is connected to the second tap via transmission lines 142 and 144. Each of the connecting transmission lines has a propagation delay that can be characterized by $\tau/2$. This causes a phase shift in the analog signal.

FIG. 1 also illustrates the signal paths that occur in a conventionally tuned 3-tap AFIR filter 150. Assuming ideal transconductance amplifiers and transmission line sections, the time domain-response of the AFIR filter is represented by equation (1), $$V_o(t) = V_i(t) \cdot a_1 + V_i(t-\tau) \cdot a_2 + V_i(t-2\tau) \cdot a_3 \text{ with } a_k = g_k R/2.$$

FIG. 1 illustrates how this time-domain equation is generated. When there is perfect continuity in the channels (i.e. no impedance mismatch in the circuit), the signal travels along three paths. The first signal path 101 passes through the first tap 131 of the filter 150. This results in the first term of the time-domain equation $V_i(t) \cdot a_1$, where $a_1 = g_1 R/2$. The second signal path 102 passes through the second tap 132 of the filter 150. Because this second signal path 102 passes through two delay sections, the signal is delayed by $2 \times (\tau/2) = \tau$. Thus the second term of the time-domain equation, $V_i(t-\tau) \cdot a_2$, is generated, where $a_2 = g_2 R/2$. The third signal path 103 passes through the third tap 133 of the filter 150. Because this third signal path 103 passes through four delay sections, the signal is delayed by $4 \times (\tau/2) = 2\tau$. Thus the third term of the time-domain equation, $V_i(t-2\tau) \cdot a_3$, is generated, where $a_3 = g_3 R/2$. Thus, in a conventional AFIR filter, the number of taps in the circuit corresponds with the number of polynomial terms in the time-domain response equation.

For applications operating at ultra-high data transmission rates (20-40 Gb/s) a distributed approach is a viable option for implementation of the AFIR equalizer. A problem arises however, when these high transmission systems need to be compatible with lower data transmission rates. At intermediate data transmission rates (10-20 Gb/s) the required tap delays are longer. One way to impose a longer tap delay is to lengthen the transmission lines. However, doing so takes up a lot of space during on-chip implementations of the filter.

Improvements in AFIR equalizers are desirable.

BRIEF DESCRIPTION OF THE DRAWINGS

Embodiments of the present disclosure will now be described, by way of example only, with reference to the attached Figures.

DETAILED DESCRIPTION

Figure 1:
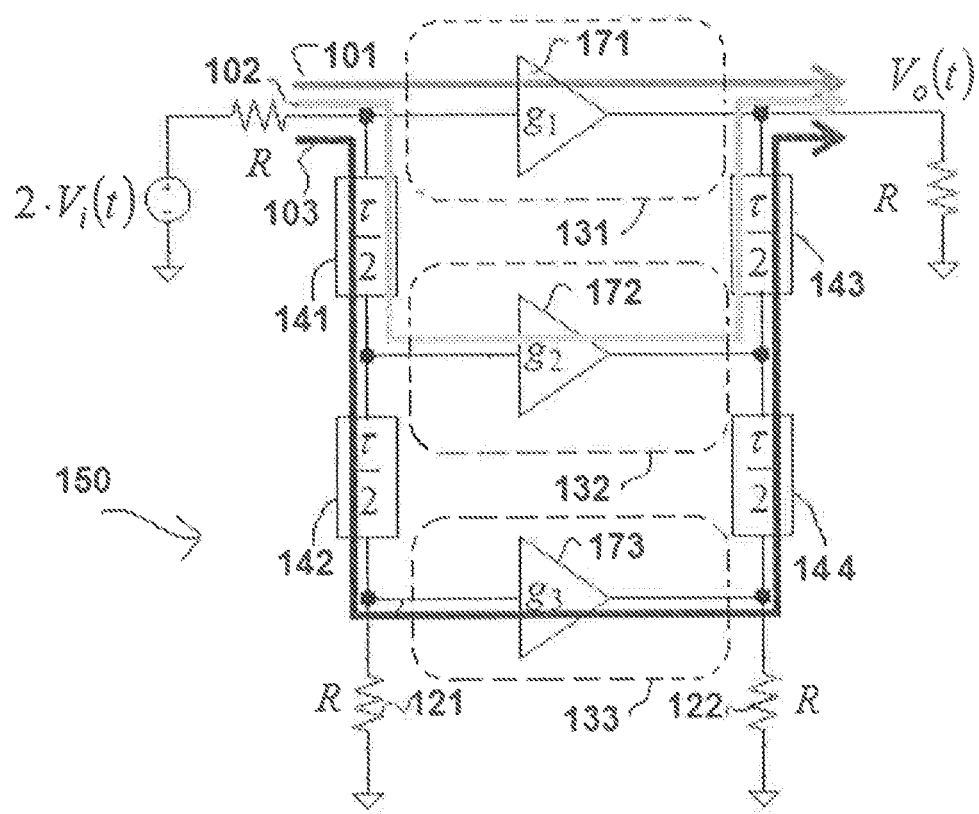
FIG. 1 illustrates a known 3-tap implementation for a distributed AFIR filter.

Generally, the present disclosure provides a distributed Analog Finite Impulse Response (AFIR) filter circuit with n physical taps that provides an output equivalent to an AFIR filter circuit with 2n−1 taps by emulating n−1 taps. An impedance mismatch is imposed at the input and output terminals to take advantage of the resulting reflective signal paths, which emulate the additional taps. This implementation results in space-savings and power-savings for on-chip implementations of the circuit.

Implementations disclosed herein are advantageous in telecommunication applications that rely heavily on copper/FR4 backplanes in serial data links. In such applications, transmission systems need to compensate for significant frequency-dependent channel losses that result from skin effect and dielectric loss in the copper traces and impedance discontinuities at the board/connector interfaces. Thus, space and power-efficient distributed AFIR filters are advantageous in such applications.

Embodiments of the present disclosure address drawbacks of known approaches by emulating a higher number of taps in an AFIR filter than are physically present in the circuit. Embodiments of the present disclosure intentionally force a mismatch of impedances at the terminations of the input and output lines of the AFIR filter the mismatch being with respect to the characteristic impedance of the respective transmission line, and take advantage of the reflections that result when the signal encounters the discontinuities in the channel.

In so doing, embodiments of the present disclosure exploit the propagation delay inherent in the tap delay sections of the transmission lines within the AFIR in order to generate additional polynomial terms in the governing time-domain response equation in AFIR filters. Embodiments of the present disclosure exploit the propagation delay twice, once during the forward transmission of the applied signal and once again when the signal is reflected back from the terminations as a result of the impedance mismatch.

Not only do embodiments of the present disclosure reduce the chip area required for implementation, but because the impedance mismatch reduces the signal dissipation in the terminations, the tap amplifiers require less power than a conventional implementation.

In an embodiment, the present disclosure provides a distributed analog finite impulse response (AFIR) filter circuit comprising: a plurality of taps including delay sections, the plurality of taps comprising n taps where n is a positive integer; input and output transmission lines each having terminal ends in communication with the plurality of taps the input and output transmission lines having first and second characteristic impedances respectively; and first and second termination impedances provided in the terminal ends of the input and output transmission lines, respectively, the first and second termination impedances being mismatched with respect to the first and second characteristic impedances respectively to create, by way of reflection through the delay sections due to the mismatched first and second termination impedances, n−1 additional signal paths and n−1 corresponding emulated taps to produce a reflective AFIR filter with 2n−1 effective tap delays.

In an example embodiment, the first and second termination impedances comprise first and second termination resistors, for example variable resistors. In an example embodiment, n is an integer greater than or equal to 3.

In an example embodiment, the delay sections each comprise a transmission line and a transconductance amplifier. In an example embodiment, the delay sections have a constant time delay.

In an example embodiment, the input transmission line comprises an active input termination, capable of providing a negative first termination impedance.

In an example embodiment, the plurality of taps comprises three physical taps and: a first physical tap is connected to the second tap by two delay sections; a second physical tap is connected to a third physical tap by two delay sections; and the termination impedances are connected to the third physical tap.

In an example embodiment, the plurality of taps comprises two physical taps configured to provide a first output signal equivalent to a second output signal provided by three physical taps.

In an example embodiment, the plurality of taps comprises two physical taps, and wherein the first and second termination impedances are in series with a first delay section, the first tap, and a second delay section.

In an example embodiment, the plurality of taps comprises a single physical tap configured to provide a first output signal equivalent to a second output signal provided by three physical taps. In an example embodiment: the single physical tap is connected to the first and second termination resistors by two delay sections; the input transmission line comprises an active input termination capable of providing a negative first termination impedance.

In an embodiment, the present disclosure provides a method of constructing a distributed analog finite impulse response filter circuit comprising: providing a plurality of taps including delay sections, the plurality of taps comprising n taps where n is a positive integer; providing input and output transmission lines each having terminal ends in communication with the plurality of taps, the input and output transmission lines having first and second characteristic impedances, respectively; providing first and second termination resistors in the terminal ends of the input and output transmission lines, respectively, the first and second termination impedances being mismatched with respect to the first and second characteristic impedances respectively; and creating, by way of reflection through the delay sections due to the mismatched first and second impedances, n−1 additional signal paths and n−1 corresponding emulated taps to produce a reflective AFIR filter with 2n−1 effective tap delays. In an example embodiment, the method further comprises eliminating by way of circuit reduction, the added n−1 taps to create a filter circuit of n effective taps, for example with n−1 independent coefficients.

Figure 2:
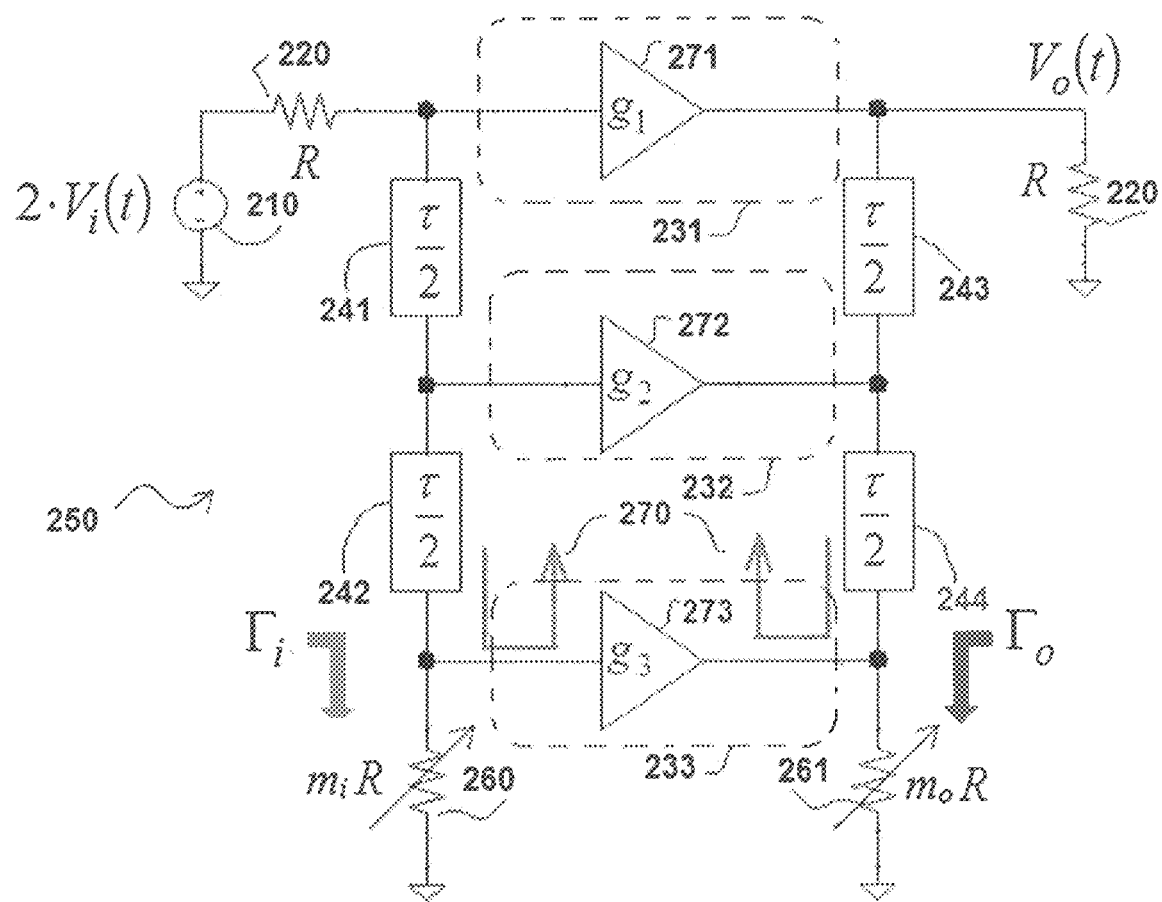
FIG. 2 illustrates a 3-tap implementation of a reflective AFIR filter according to an embodiment of the present disclosure with mismatched input and output impedances.

FIG. 2 illustrates a 3-tap implementation of a reflective AFIR filter 250 according to an embodiment of the present disclosure with three taps connected by four transmission lines and first and second termination impedances, shown as two termination resistors. Note that the impedance of the input termination resistor 260 and the resistance of the output termination resistor 261 are intentionally selected to be different from the characteristic impedance of their respective transmission lines. For example, the impedance of the input termination resistor is set to a value of $m_iR$ and the output transmission is set to a value of $m_oR$. It is worth noting that in this embodiment neither $m_i$ nor $m_o$ is equal to 1 as that would result in the conventional 3-tap implementation of the AFIR filter shown in FIG. 1. The first tap 231 of the filter comprises a transconductance amplifier with gain $g_1$. The second tap 232 comprises a transconductance amplifier with gain $g_2$ 272. The third tap 233 comprises a transconductance amplifier with gain $g_3$. The first tap is connected to the second tap via transmission lines 241 and 243. The third tap is connected to the second tap via transmission lines 242 and 244. Each of the connecting transmission lines has a time delay that can be characterized by $\tau/2$.

A feature of the reflective AFIR filter of FIG. 2 according to an embodiment of the present disclosure is that the value of the input termination resistor 260 and the value of the output termination resistor 261 do not match the characteristic impedance of their respective transmission lines. In this case, the input termination resistor 260 has a value of $m_iR$ and the output termination resistor 261 has a value of $m_oR$. Thus the input termination is characterized by input reflection coefficient $$I_i' = \frac{m_i - 1}{m_i + 1}$$

and the output termination is characterized by output reflection coefficient $$I_o' = \frac{m_o - 1}{m_o + 1}.$$

This impedance mismatch creates a discontinuity in the transmission lines which causes and introduces signal reflection 270 at the third tap 233.

Figure 3A:
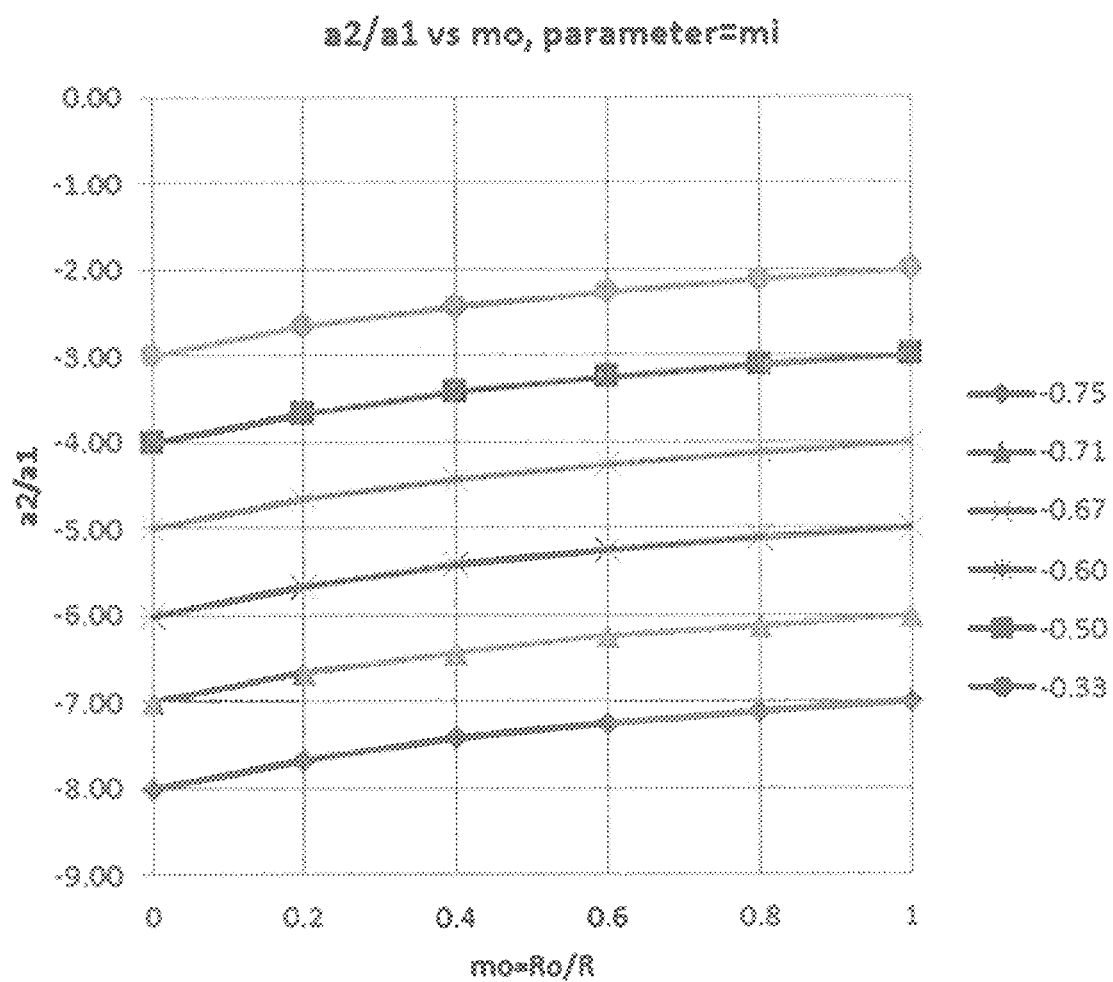
FIGS. 3A and 3B illustrate two independent AFIR coefficients a2 and a3, normalized to the a1 coefficient, as a function of $m_o$ with $m_i$ as parameter.
Figure 3B:
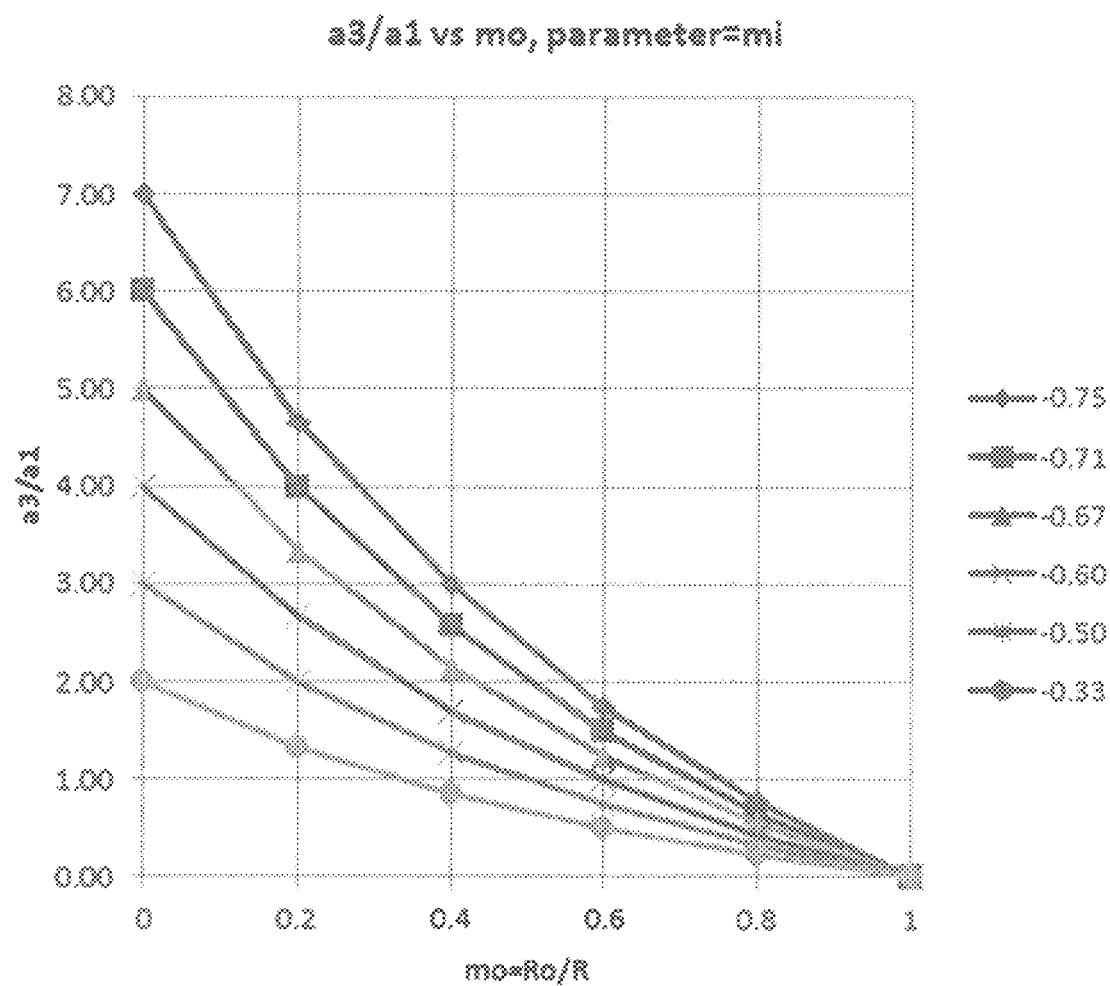

FIGS. 3A and 3B illustrate two independent AFIR coefficients a2 and a3, normalized to the a1 coefficient, as a function of $m_o$ with $m_i$ as parameter. In an example embodiment for A 3-tap AFIR, only two independent (relative) coefficients a2/a1 and a3/a1 are used to determine the frequency (magnitude, phase) response of the AFIR. The coefficient a1 can be viewed as a gain factor and as such has no bearing on the adaptation algorithm of the AFIR. The plots for a2/a1 in FIG. 3A, and for a3/a1 in FIG. 3B, show that both coefficients depend on input parameters $m_i$ and $m_o$. The plots in FIGS. 3A and 3B are also an indication of the coefficient space that can be obtained.

In an example embodiment, the ranges of both $m_i$ and $m_o$ are limited to the values shown in FIGS. 3A and 3B such that the resulting a2/a1, a3/a1 coefficients cover the space that is typically required and sufficient for equalization purposes. In an example embodiment, such constraints can be described as: the pre-cursor a1 and post-cursor a3 have the same sign, opposite that of the cursor a2; and the sum of the magnitudes of a1 and a3 is less than the magnitude of a2. For FIGS. 3A and 3B, this means that a3/a1>0, |a3/a1|<|a2/a1|−1. In an example embodiment for a 28 Gb/s receiver with 20 dB loss channel, the optimal coefficients are as follows: a1=1, a2=−4.21 and a3=2.43. The corresponding values for $m_i$ and $m_o$ are: $m_i$=−0.558 and $m_o$=0.182.

FIGS. 4A, 4B, 4C, 4D, 4E, 4F, 4G, 4H, and 4I illustrate the signal paths in a reflective AFIR filter 250. Signal paths 304, 305, 306, 307, 308, and 309 as illustrated by FIGS. 4D, 4E, 4F, 4H, and 4I are a result of the signal reflection 270 introduced by the mismatched input and output termination resistors 260 and 261. When discontinuity is introduced into the circuit by an impedance mismatch at the input and output resistors, signal reflection 270 occurs at the point of discontinuity. Assuming ideal transconductance amplifiers and transmission line sections, the time domain-response of the AFIR filter is represented by equation (2), $$V_o(t)=V_i(t)+V_i(t-\tau)\cdot a_2+V_i(t-2\tau)\cdot[(a_1+a_2)\cdot(I_i'+I_o')+a_3\cdot(1+I_i')\cdot(1+I_o')]+V_i(t-3\tau)\cdot a_2I_iI_o'+V_i(t-4\tau)\cdot a_1I_iI_o' \quad (2)$$

Note that despite the fact that the reflective AFIR filter 250 has three physical taps in the circuit; the time-domain response of the reflective AFIR filter has five terms, thus emulating a five-tap filter. FIGS. 4A, 4B, 4C, 4D, 4E, 4F, 4G, 4H, and 4I illustrate how these five polynomial terms in the time-domain response equation are generated along nine paths.

Figure 4A:
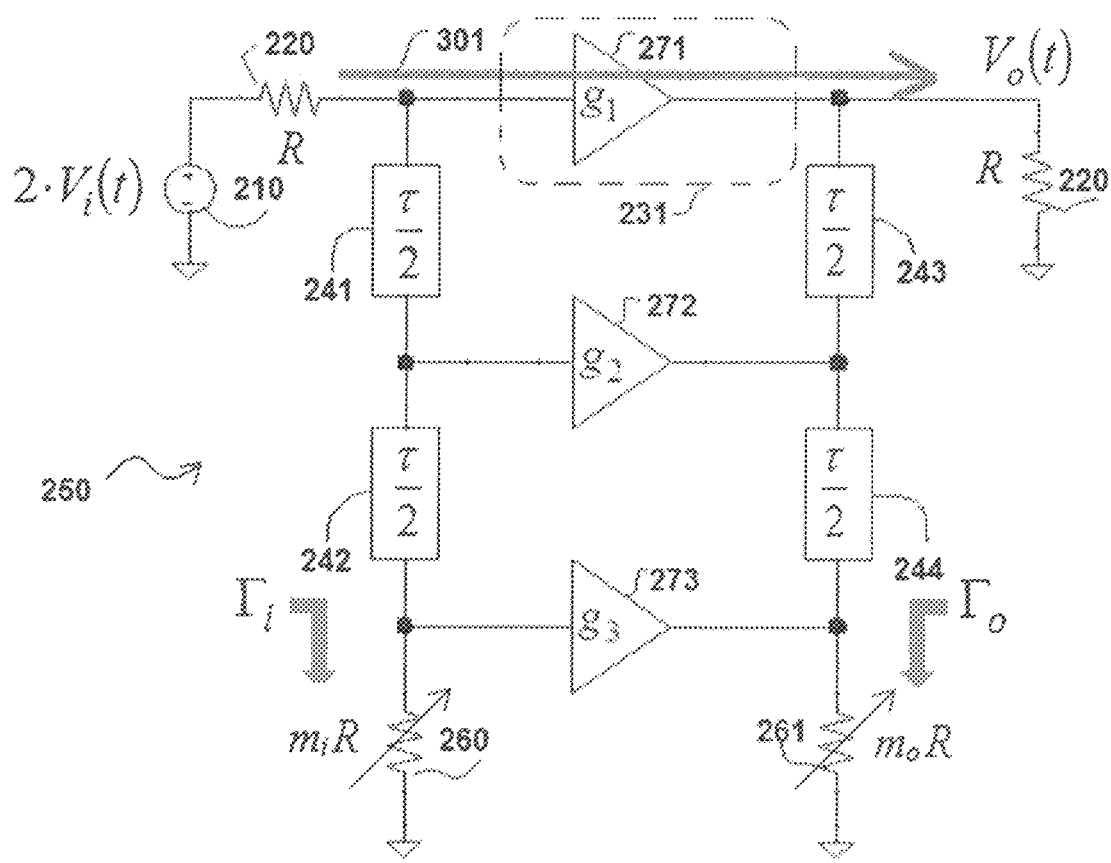
FIGS. 4A, 4B, 4C, 4D, 4E, 4F, 4G, 4H and 4I illustrate the signal paths that result from mismatched input and output impedances according to an embodiment of the present disclosure.

The first signal path is illustrated in FIG. 4A. The first signal path 301 passes through the first tap 231 of the reflective filter 250. Thus the first term of the time-domain equation, $V_i(t)\cdot a_1$, is generated: $[V_o(t)=V_i(t)\cdot a_1]$.

Figure 4B:
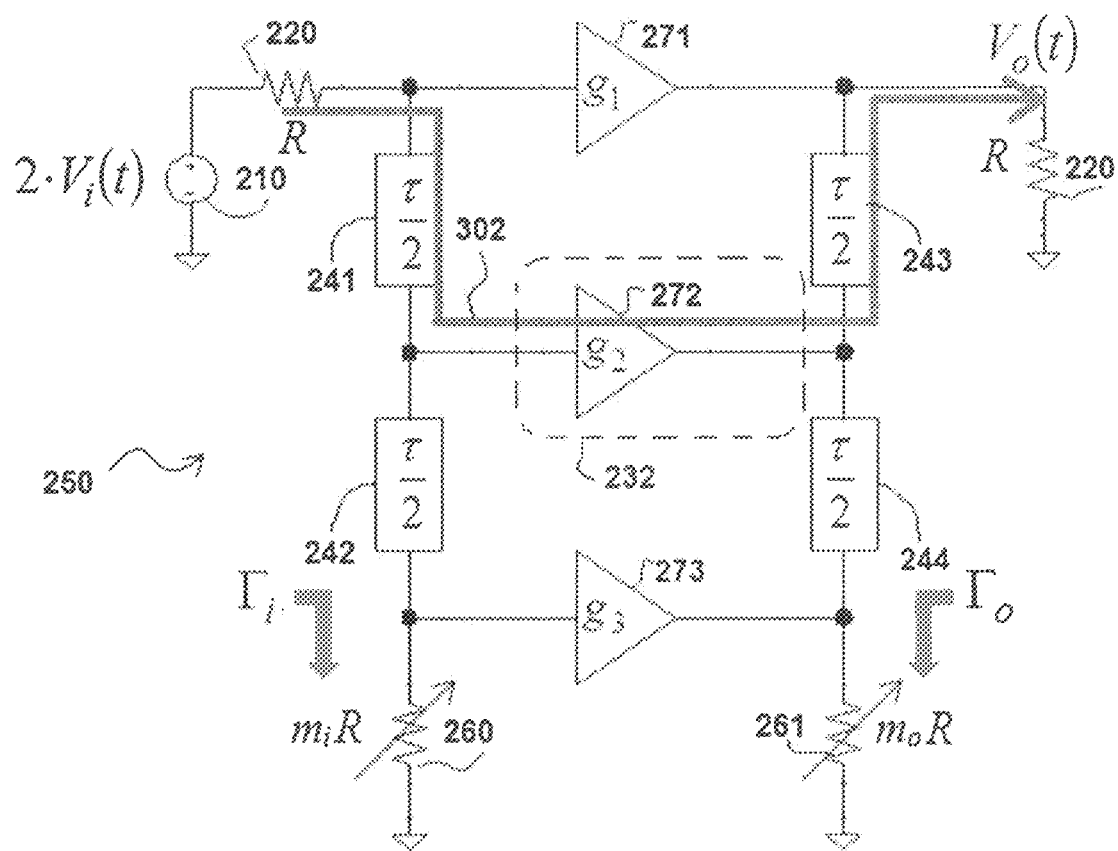

The second signal path is illustrated in FIG. 4B. The second signal path 302 passes through the second tap 232 of the reflective filter 250. Because this second signal path 302 passes through two delay sections, the signal is delayed by $2\times(\tau/2)=\tau$. Thus the second term of the time-domain equation $V_i(t-\tau)\cdot a_2$ is generated $[V_o(t)=V_i(t)\cdot a_1+V_i(t-\tau)\cdot a_2]$.

Figure 4C:
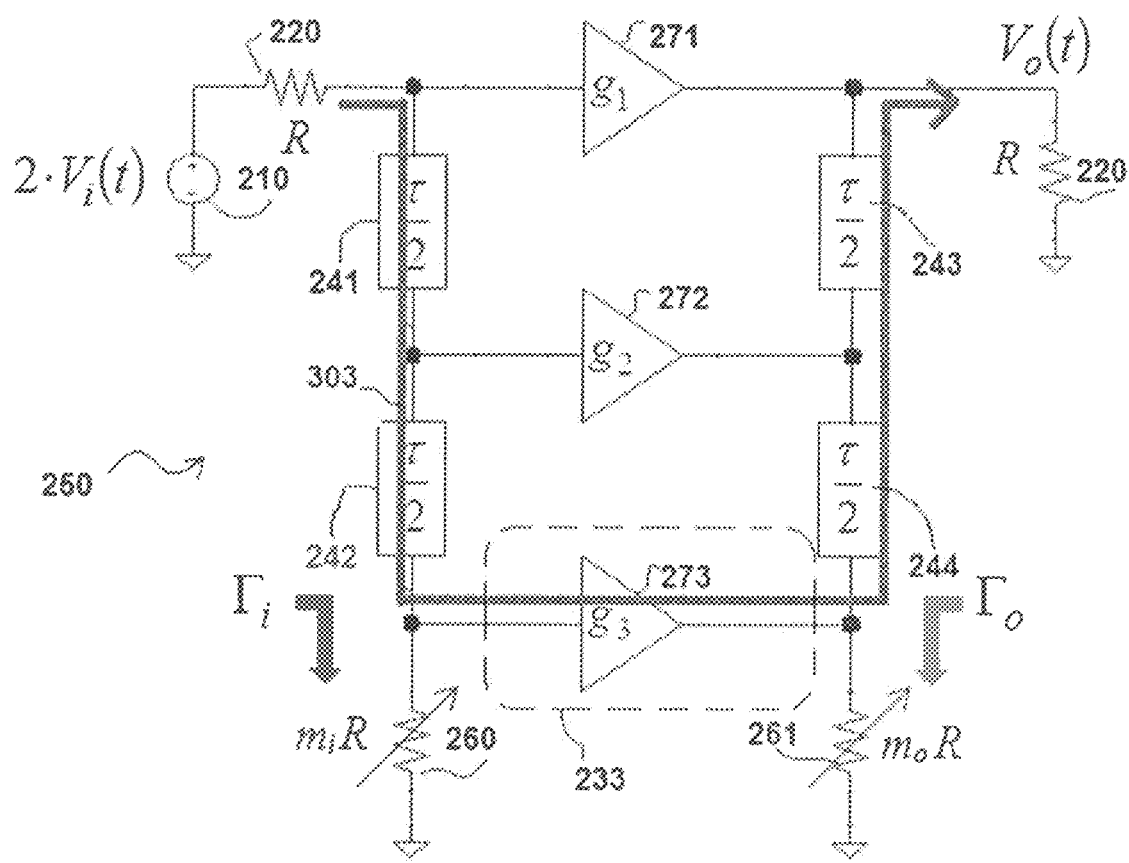
Figure 4D:
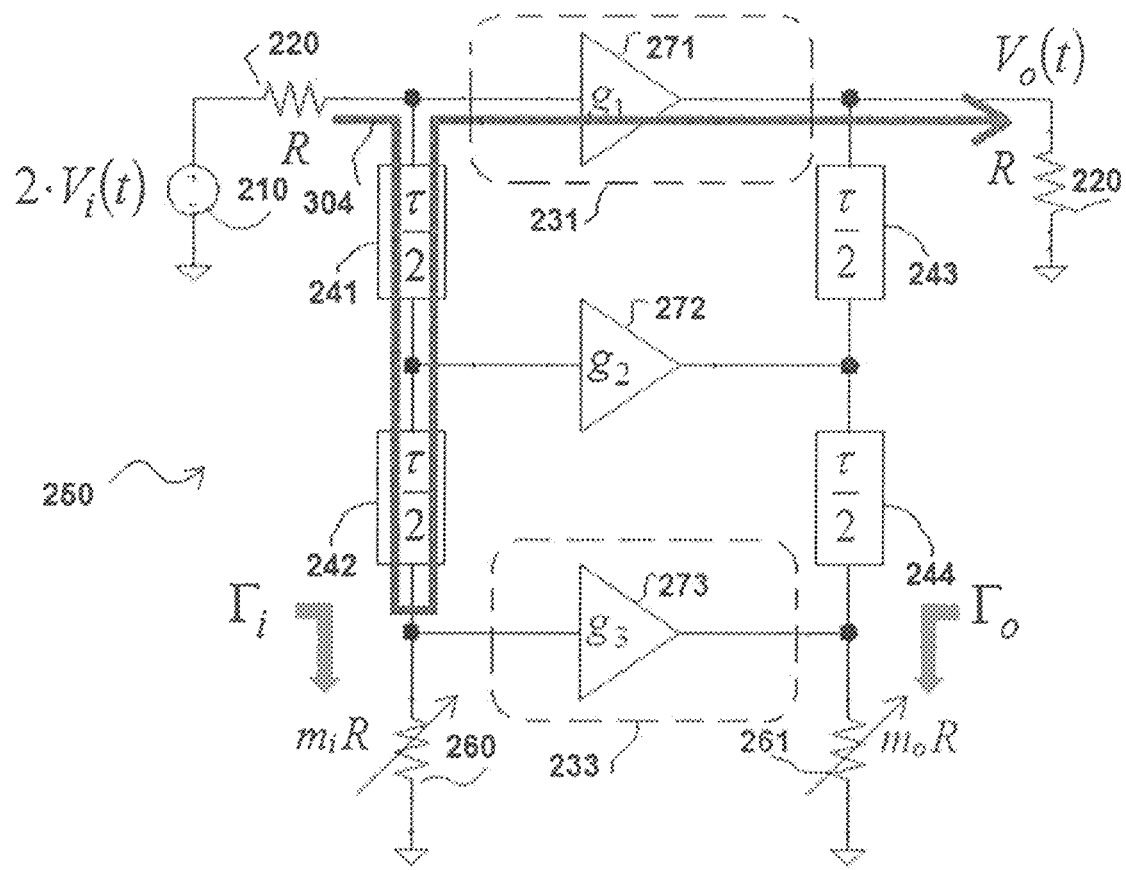

The third signal path is illustrated in FIG. 4C. The third signal path 303 passes through the third tap 233 of the reflective filter 250. Because this third signal path 303 passes through four delay sections, the signal is delayed by $4\times(\tau/2)=2\tau$. Thus a first factor of the third term of the time-domain equation, $V_i(t-2\tau)\cdot[a_3\cdot(1+I_i')\cdot(1+I_o')]$, is generated: $V_o(t)=V_i(t)\cdot a_1+V_i(t-\tau)\cdot a_2+V_i(t-2\tau)\cdot[(a_1+a_2)\cdot(I_i'+I_o')+a_3\cdot(1+I_i')\cdot(1+I_o')]$ The fourth signal path is illustrated in FIG. 4D. The fourth signal path 304 passes through two delay sections 241 and 242 to the third tap 233. At the third tap 233, the signal is reflected back up the two delay sections 242 and 241 and travels along the first tap 231 to the output. Because this fourth signal path 304 passes through two delay sections twice, the signal is delayed by $4\times(\tau/2)=2\tau$. Thus a second component of the third term of the time-domain equation is generated:

$$V_o(t)=V_i(t)\cdot a_1+V_i(t-\tau)\cdot a_2+V_i(t-2\tau)\cdot[(a_1+a_2)\cdot(I_i'+I_o')+a_3\cdot(1+I_i')\cdot(1+I_o')]$$

Figure 4E:
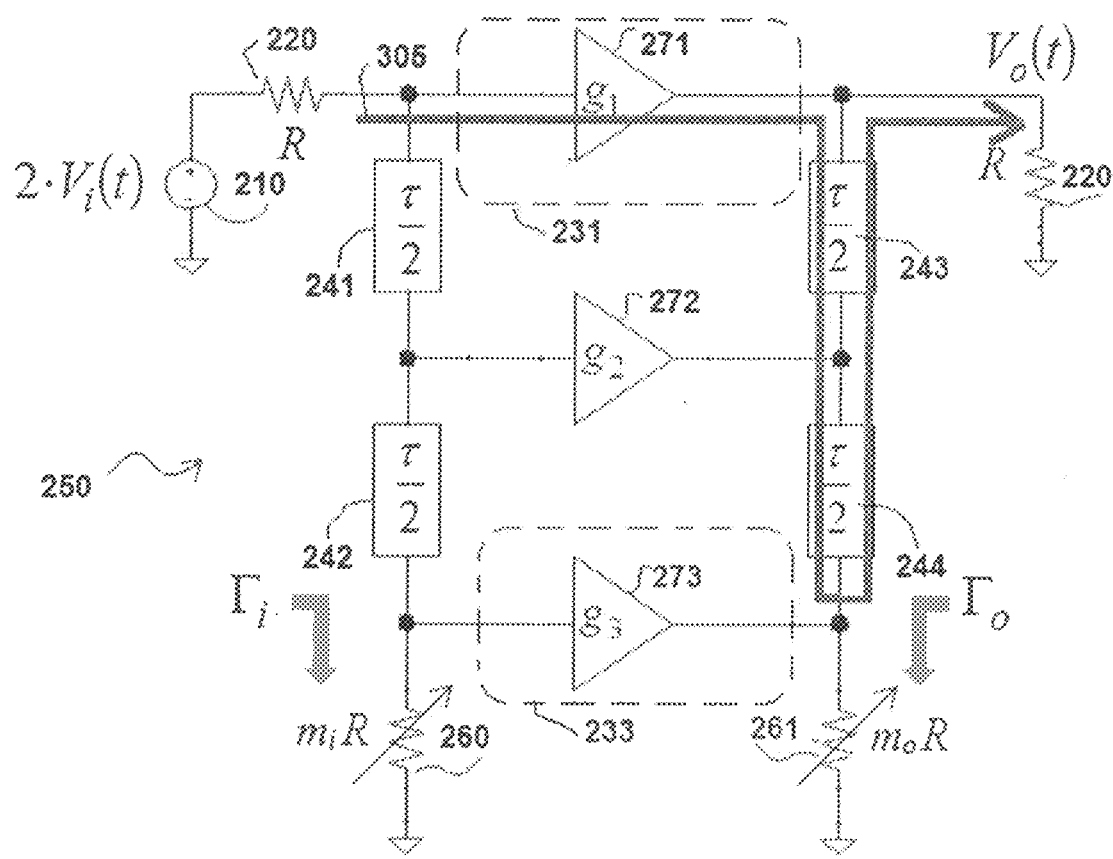

The fifth signal path is illustrated in FIG. 4E. The fifth signal path 305 travels along the first tap 231 to and then passes through two delay sections 243 and 244 to the third tap 233. At the third tap 233, the signal is reflected back up the two delay sections 243 and 244 and the output. Because this fifth signal path 305 passes through two delay sections twice, the signal is delayed by $4\times(\tau/2)=2\tau$. Thus a third component of the third term of the time-domain equation is generated:

$$V_o(t)=V_i(t)\cdot a_1+V_i(t-T)\cdot a_2+V_i(t-2\tau)\cdot[(a_1+a_2)\cdot(I_i'+I_o')+a_3\cdot(1+I_i')\cdot(1+I_o')]$$

Figure 4F:
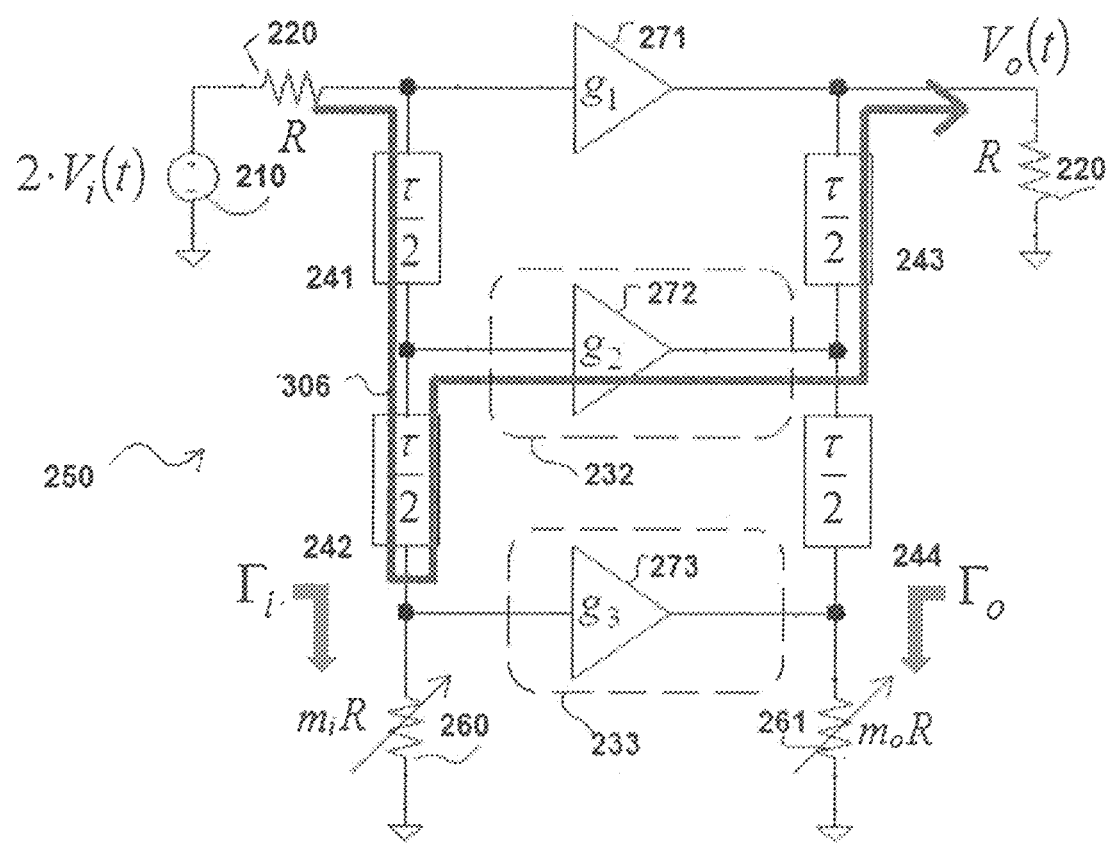

The sixth signal path is illustrated in FIG. 4F. The sixth signal path 306 passes through delay sections 241 and 242 to the third tap 233. At the third tap 233, the signal is reflected back up along delay section 242. At the second tap 242 the signal passes through 232 and delay section 243 to the output. Because this sixth signal path 306 passes through four delay sections, the signal is delayed by $4\times(\tau/2)=2\tau$. Thus a fourth component of the third term of the time-domain equation is generated:

$$V_o(t)=V_i(t)\cdot a_1+V_i(t-\tau)\cdot a_2+V(t-2\tau)\cdot[(a_1+a_2)\cdot(I_i'+I_o') + a_3\cdot(1+I_i')\cdot(1+I_o')]$$

Figure 4G:
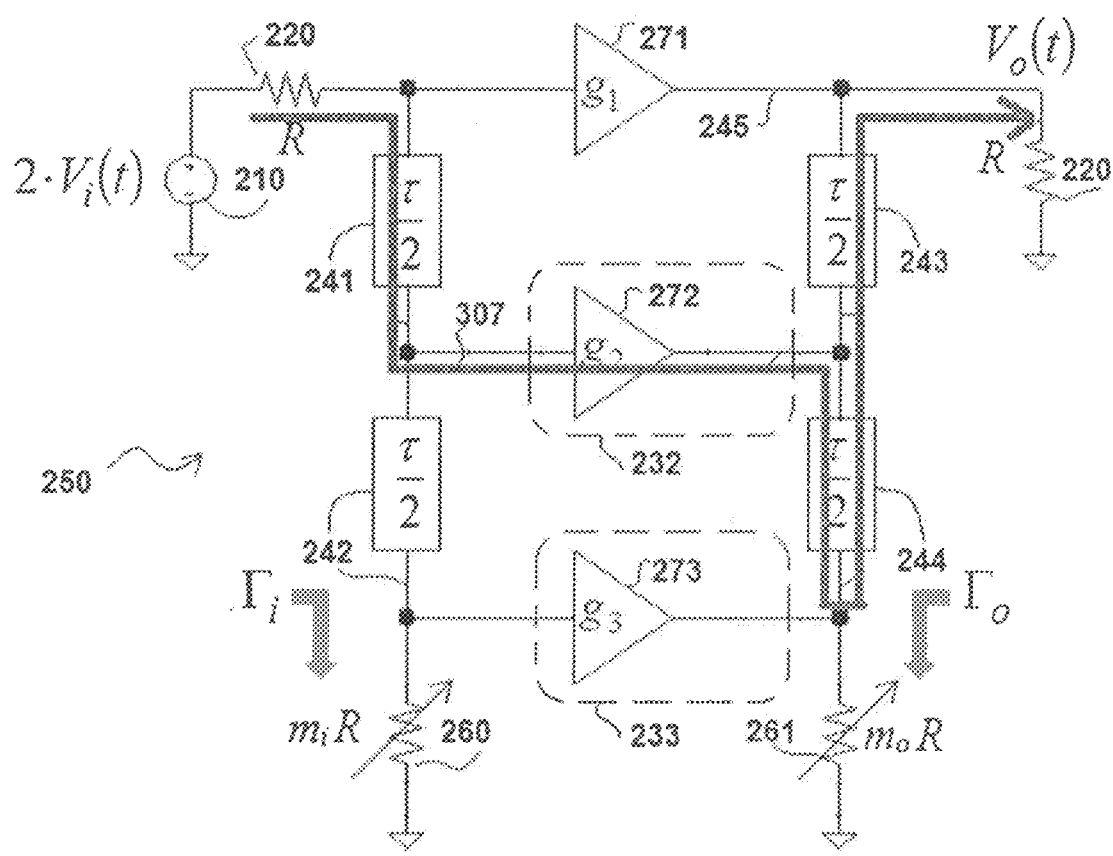

The seventh signal path is illustrated in FIG. 4G. The seventh signal path 307 passes through delay section 241, the second tap 232, and delay section 244 to the third tap 233. At the third tap 233, the signal is reflected back up along two delay sections 244 and 243 to the output. Because this seventh signal path 307 passes through four delay sections, the signal is delayed by $4\times(\tau/2)=2\tau$. Thus a fifth component of the third term of the time-domain equation is generated:

$$V_o(t)=V_i(t)\cdot a_1+V_i(t-\tau)\cdot a_2+V_i(t-2\tau)\cdot[(a_1+a_2)\cdot(I_i'+I_o') + a_3\cdot(1+I_i')\cdot(1+I_o')]$$

Figure 4H:
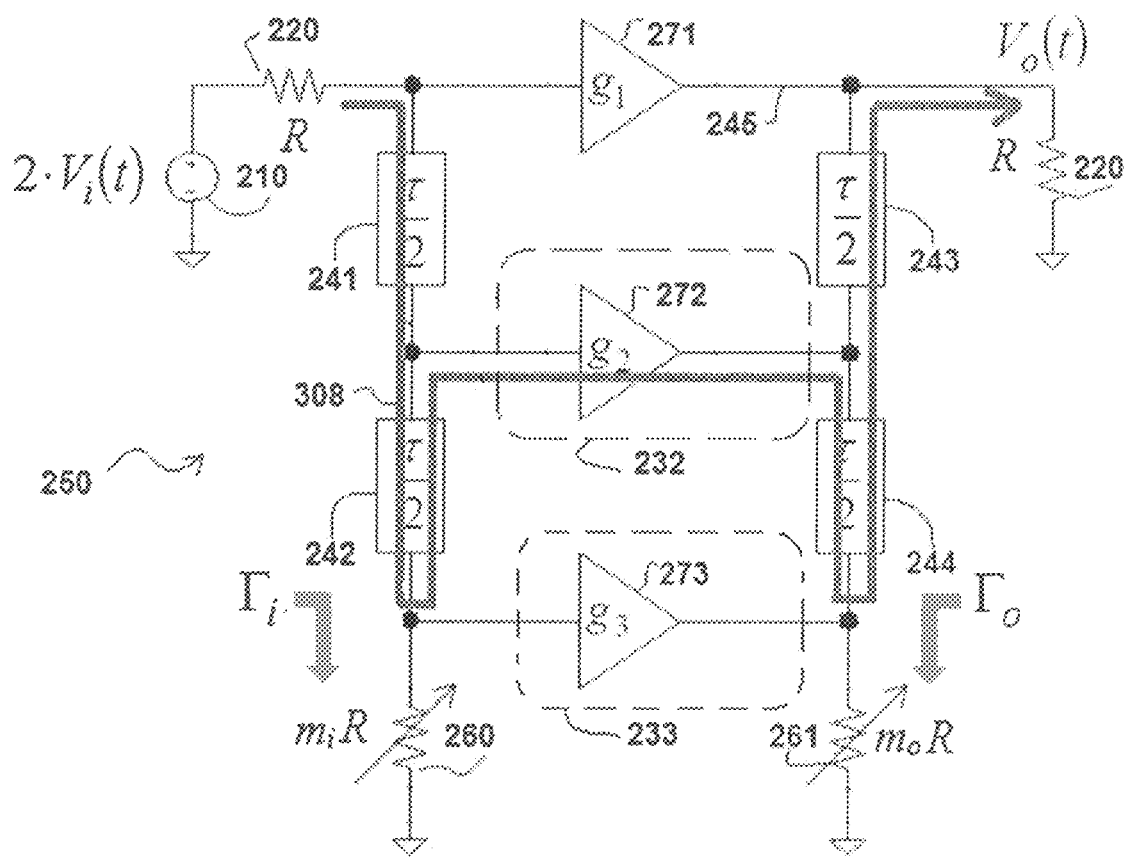

The eighth signal path is illustrated in FIG. 4H. The eighth signal path 308 passes through two delay sections 241 and 242 to the third tap 233. At the third tap 233, the signal is reflected back up along delay section 242 to the second tap 232. It then travels along the second tap 232 and along delay section 244 to the third tap 233 where it is reflected along delay section 244 and 243 to the output. Because this eighth signal path 308 passes through six delay sections, the signal is delayed by $6\times(\tau/2)=3\tau$. Thus the fourth term of the time-domain equation is generated:

$$V_o(t)=V_i(t)\cdot a_1+V_i(t-\tau)\cdot a_2+V_i(t-2\tau)\cdot[(a_1+a_2)\cdot(I_i'+I_o') + a_3\cdot(1+I_i')\cdot(1+I_o')]+V_i(t-3\tau)\cdot a_2 I_i' T'+V_i(t-4\tau)\cdot a_1 I_i' I_o'$$

Figure 4I:
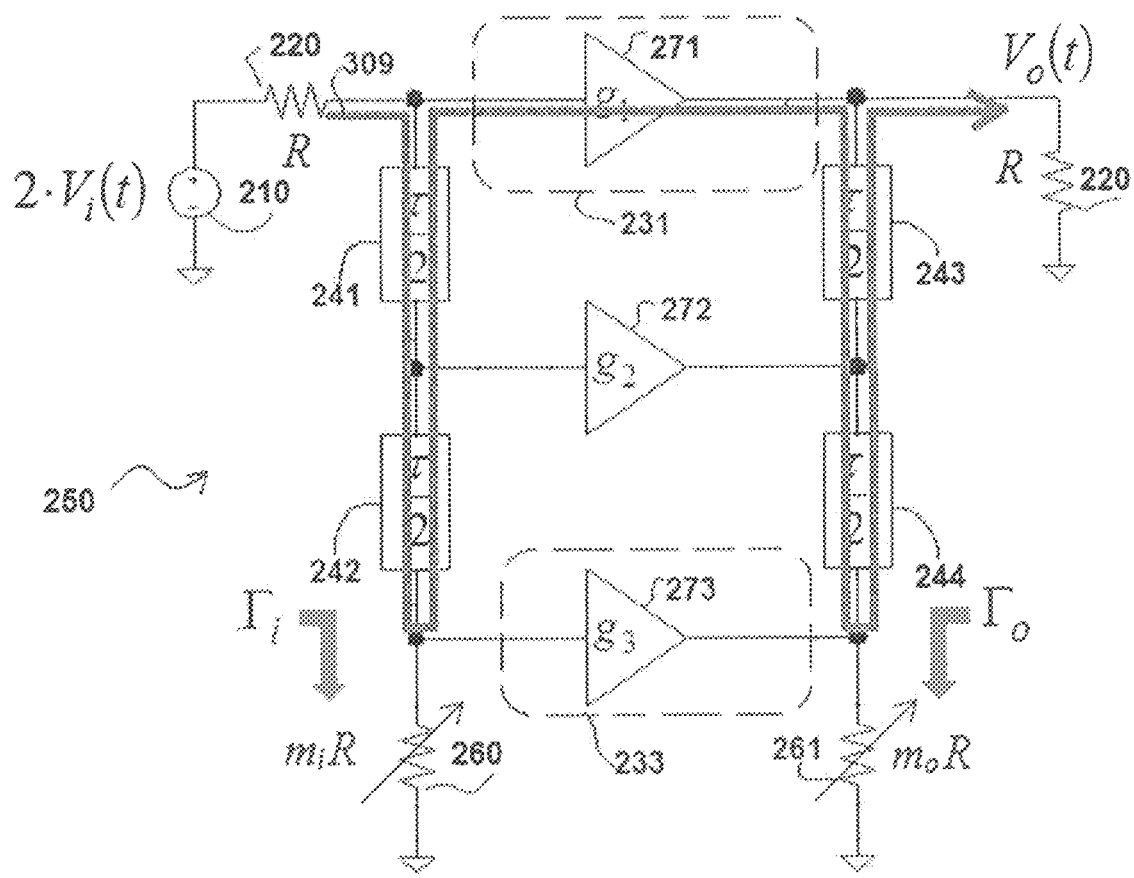

The ninth signal path is illustrated in FIG. 4I. The ninth signal path 309 passes through two delay sections 241 and 242 to the third tap 233. At the third tap 233, the signal is reflected back up along delay sections 242 and 241 to the first tap 231. It then travels along the first tap 231 and along delay section 243 and 244 to the third tap 233 where it is reflected along delay section 244 and 243 to the output. Because this ninth signal path 309 passes through eight delay sections, the signal is delayed by $8\times(\tau/2)=4\tau$. Thus the fifth term of the time-domain equation is generated:

$$V_o(t)=V_i(t)\cdot a_1+V_i(t-\tau)\cdot a_2+V_i(t-2\tau)\cdot[(a_1+a_2)\cdot(I_i'+I_o') + a_3\cdot(1+I_i')\cdot(1+I_o')]+V_i(t-3\tau)\cdot a_2 I_i' T'+V_i(t-4\tau)\cdot a_1 I_i' I_o'$$

Figure 5A:
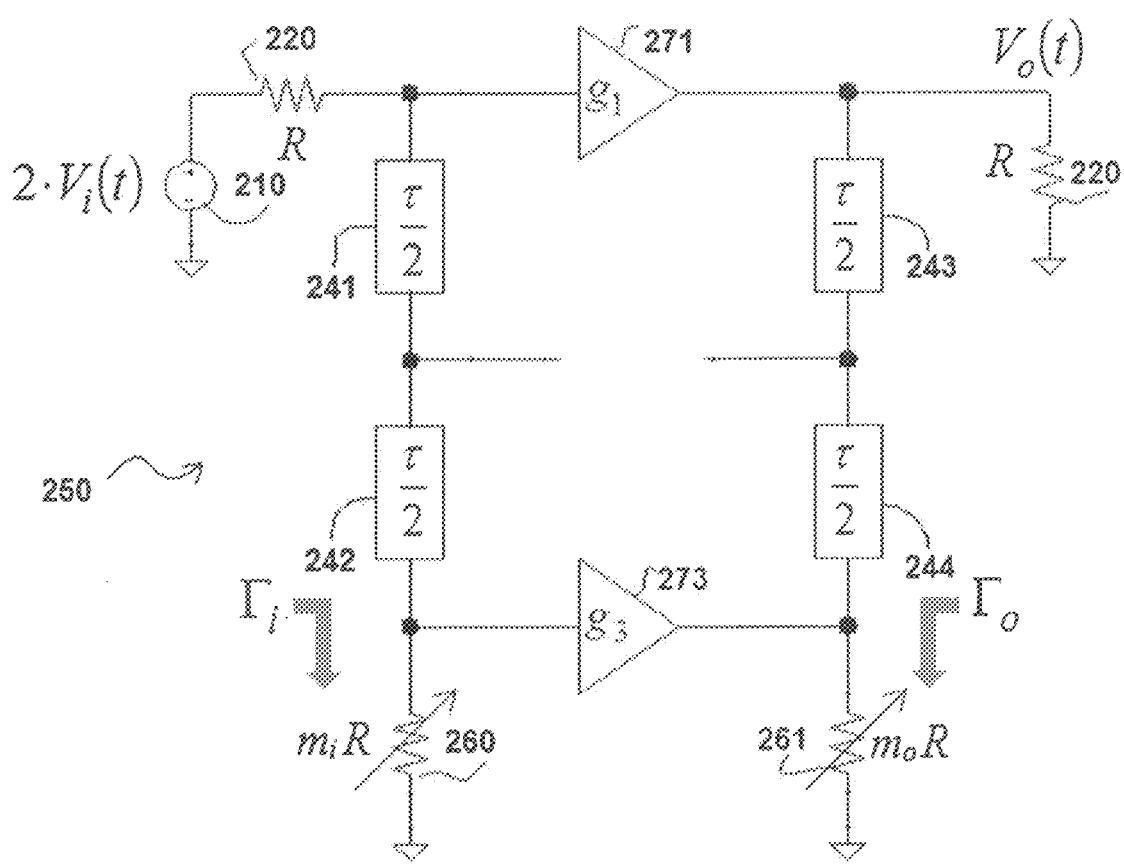
FIGS. 5A, 5B, 5C illustrate a simplified 3-tap Reflective AFIR filter according to an embodiment of the present disclosure.
Figure 5B:
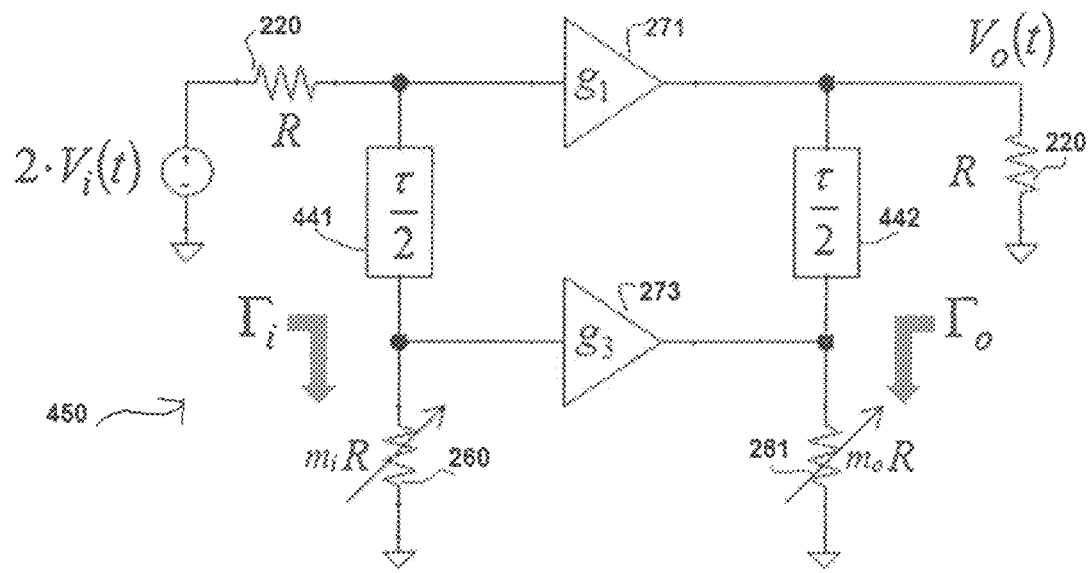
Figure 5C:
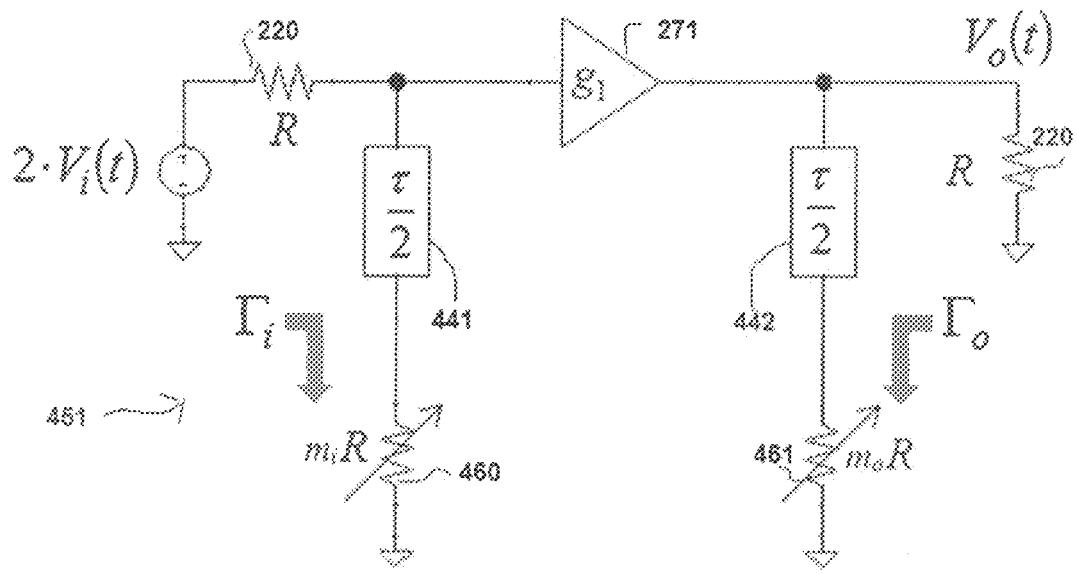

FIGS. 5A, 5B, and 5C illustrate a 3-tap reflective AFIR filter 250 according to an embodiment of the present disclosure that has undergone circuit reduction. By eliminating the second tap 232 of FIG. 2, the circuit of FIG. 5A has a time-domain response equation that can be simplified by setting $a_2$ to 0, with the following result:

$$V_o(t)=V_i(t)\cdot a_1+V_i(t-2\tau)\cdot[(a_1)\cdot(I_i'+I_o')+a_3\cdot(1+I_i')\cdot(1+I_o')]+V_i(t-4\tau)\cdot a_1 I_i' I_o' = V_i(t)\cdot a_1+V_i(t-2\tau)\cdot[(a_1)\cdot(I_i'+I_o')+a_3\cdot(1+I_i')\cdot(1+I_o')]+V_i(t-4\tau)\cdot a_1 I_i' I_o'.$$

This reduction returns the time-domain response of the reflective AFIR filter to a three-term polynomial equation typical of a three-tap AFIR filter with increased time delay since the time delay between taps has increased from $\tau$ to $2\tau$. It can be re-written in the standard form of equation (1) and expressed as $V_o(t)=a_1\cdot V_i(t)+a_2\cdot V_i(t-\tau)+a_3\cdot V_i(t-2\tau)$, where $$a_1 = g_1 \frac{R}{2}$$

and $$a_2 = g_1 \frac{R}{2}\left\{(I'i+I'o)+\frac{g_3}{g_1}(1+I_i')\cdot(1+I_o')\right\}, a_3 = g_1 \frac{R}{2} I_i' I_o'$$

and implemented as an effective three-tap AFIR filter with two physical taps 271 and 273 in the filter circuit 450 as shown in FIG. 5B.

FIG. 5C shows that the filter circuit 450 can be reduced further by eliminating the amplifier 273 from FIG. 5B. The resulting circuit is a simplified effective three-tap AFIR filter that only requires one amplifier for on-chip implementation 451. The resulting time-domain equation for this circuit is $V_o(t)=V_i(t)\cdot a_1+V_i(t-\tau)\cdot a_2+V_i(t-2\tau)\cdot a_3$, where $$a_1 = g_1 \frac{R}{2}, a_2 = g_1 \frac{R}{2}(I_i' + I_o'), a_3 = g_1 \frac{R}{2}(I_i' I_o')$$

and the input impedance is characterized by $$I_i' = \frac{m_i - 1}{m_i + 1}$$

and the output impedance is characterized by $$I_o' = \frac{m_o - 1}{m_o + 1}$$

where $m_i, m_o \geq 0 \rightarrow |I_i'|, |I_o'| \leq 1$.

Figure 6A:
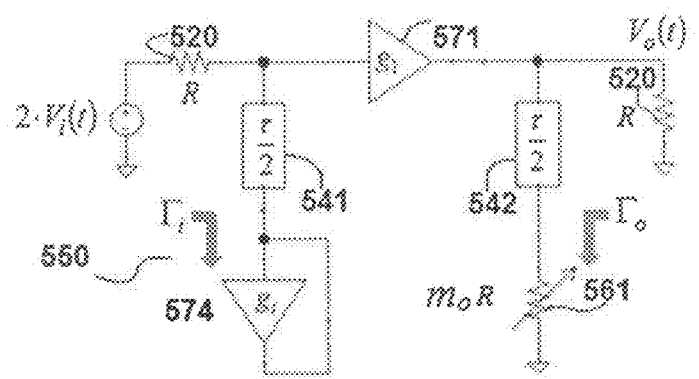
FIGS. 6A and 6B illustrate a simplified 3-tap Reflective AFIR filter with an active termination according to an embodiment of the present disclosure.
Figure 6B:
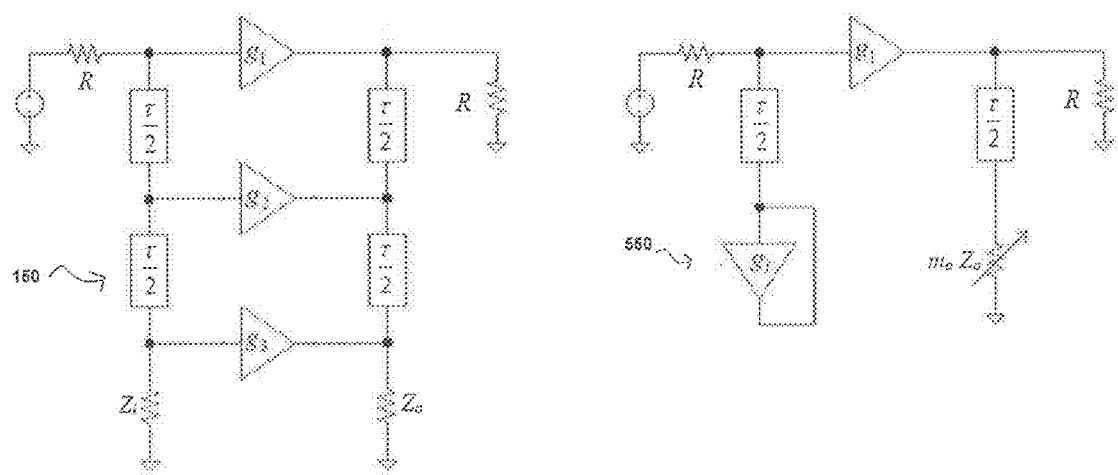

FIGS. 6A and 6B illustrate a simplified 3-tap Reflective AFIR filter with active terminations according to an embodiment of the present disclosure. An active termination is an implementation of a negative-resistance termination. If $m_i R$ and $m_o R$ are passive (i.e. $m_i$ and $m_o$ are non-negative), both reflection coefficients $$I_i' = \frac{m_i - 1}{m_i + 1}$$

and $$I_o' = \frac{m_o - 1}{m_o + 1}$$

have a real value between −1 and +1. In real-world applications the second tap of an AFIR filter represents the cursor gain, with the first and last tap controlling the pre- and post-cursor gains, respectively. Typically, pre- and post-cursor gains are set to be negative relative to the cursor with a magnitude less than the cursor. To achieve the required degree of freedom, it is only necessary to set the magnitude of one of the reflection coefficients to be greater than 1. This can be accomplished by using an active termination on either end implemented with a transconductance amplifier in a positive feedback configuration 574 and setting $m_i \leq 0$ so that $|I_i'| \geq 1$.

FIG. 6A shows the implementation of a simplified three-tap reflective AFIR filter 550 having active input-side termination 574 where $$g_1 = \frac{1}{Rm_i}.$$

If a transconductance amplifier is used for the active termination 574, similar to the gain amplifier $g_1$, the dynamic range of the overall AFIR is not affected. To maintain stability one can set $1/g_t<R$ ensuring the circuit remains passive. The resulting time-domain equation for the filter circuit 550 is $V_o(t)=V_i(t)\cdot a_1+V_i(t-\tau)\cdot a_2+V_i(t-2\tau)\cdot a_3$, where $$a_1 = g_1\frac{R}{2}, \quad a_2 = g_1\frac{R}{2}(I'_i + I'_o), \quad a_3 = g_1\frac{R}{2}(I'_i I'_o)$$

and the input termination is characterized by $$I'_i = \frac{1+g_iR}{1-g_iR}$$

and the output termination is characterized by $$I'_o = \frac{m_o - 1}{m_o + 1}$$

where $m_i \leq 0 \rightarrow |I_i'| \geq 1$.

FIG. 6B shows a side-by-side comparison of the conventional 3-tap AFIR filter 150 such as in FIG. 1 and a simplified three-tap reflective AFIR filter circuit 550 of FIG. 6A. Note that the time-domain equation of the simplified three-tap reflective AFIR filter circuit 550 emulates the 3-term polynomial equation that models the conventional three-tap AFIR filter circuit 150 yet the reflective AFIR filter 550 uses significantly fewer circuit components.

For sake of simplicity, only a 3-tap distributed AFIR filter has been illustrated with respect to the embodiments described in detail herein. In other embodiments, the principles outlined above are applied to AFIR filter circuits with any number of taps. Generalizing the approach disclosed herein, when an impedance mismatch is applied to a distributed n-tap AFIR filter circuits with tap coefficients ($a_1, a_2 \ldots a_n$), the result will be an AFIR with 2n-1 effective taps and coefficients ($b_1, b_2 \ldots b_{2n-1}$):

$$b_k = a_k \quad \text{for taps } k = 1 \text{ to } k = n-1$$

$$b_n = \sum_{k=1}^{n-1} a_k(\Gamma_i + \Gamma_o) + a_n(1+\Gamma_i)(1+\Gamma_o)$$

$$b_k = a_k \Gamma_i \Gamma_o \quad \text{for taps } k = n+1 \text{ to } k = 2n-1$$

In an embodiment, the present disclosure provides a method of constructing a distributed analog finite impulse response (AFIR) filter circuit comprising: providing a plurality of taps including delay sections, the plurality of taps comprising n taps where n is a positive integer; providing input and output transmission lines each having terminal ends in communication with the plurality of taps; providing first and second termination resistors in the terminal ends of the input and output transmission lines, respectively, the first and second termination resistors having mismatched first and second impedances; and creating, by way of reflection through the delay sections due to the mismatched first and second impedances, n−1 additional signal paths and n−1 corresponding emulated taps to produce a reflective AFIR filter with 2n−1 effective tap delays.

Other aspects and features of the present disclosure will become apparent to those ordinarily skilled in the art upon review of the following description of specific embodiments in conjunction with the accompanying figures.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

The above-described embodiments are intended to be examples only. Alterations, modifications and variations can be effected to the particular embodiments by those of skill in the art without departing from the scope, which is defined solely by the claims appended hereto.

What is claimed is:

1. A distributed analog finite impulse response (AFIR) filter circuit comprising:
    a plurality of taps including delay sections, the plurality of taps comprising n taps where n is a positive integer greater than or equal to 2;
    input and output transmission lines each having terminal ends in communication with the plurality of taps the input and output transmission lines having first and second characteristic impedances, respectively; and
    first and second termination impedances provided in the terminal ends of the input and output transmission lines, respectively, the first and second termination impedances being mismatched with respect to the first and second characteristic impedances respectively, to create, by way of reflection through the delay sections due to the mismatched first and second termination impedances, n−1 additional signal paths and n−1 corresponding emulated taps to produce a reflective AFIR filter with 2n−1 effective tap delays.

2. The distributed AFIR filter circuit of claim 1, wherein the first and second termination impedances comprise first and second termination resistors.

3. The distributed AFIR circuit of claim 2, wherein the first and second termination resistors are variable resistors.

4. The distributed AFIR circuit of claim 1, wherein the delay sections each comprise a transmission line and a transconductance amplifier.

5. The distributed AFIR circuit of claim 1, wherein the delay sections have a constant time delay.

6. The distributed AFIR circuit of claim 1, wherein the input transmission line is terminated with an active input termination capable of providing a negative first termination impedance.

7. The distributed AFIR circuit of claim 1 wherein the plurality of taps comprises three physical taps and wherein:
    a first physical tap is connected to the second tap by two delay sections;
    a second physical tap is connected to a third physical tap by two delay sections; and the termination impedances are connected to the third physical tap.

8. The distributed AFIR circuit of claim 1, wherein the plurality of taps comprises two physical taps configured to provide a first output signal equivalent to a second output signal provided by three physical taps.

9. The distributed AFIR circuit of claim 1, wherein the plurality of taps comprises two physical taps, and wherein the first and second termination impedances are in series with a first delay section, the first tap, and a second delay section.

10. The distributed AFIR circuit of claim 1, wherein the plurality of taps comprises a single physical tap configured to provide a first output signal equivalent to a second output signal provided by three physical taps.

11. The distributed AFIR circuit of claim 10, wherein:
the single physical tap is connected to the first and second termination impedances by two delay sections;
the input transmission line comprises an active input termination capable of providing a negative first termination impedance.

12. A distributed analog finite impulse response (AFIR) filter circuit comprising:
a plurality of taps including delay sections, the plurality of taps comprising n taps wherein n is an integer greater than or equal to 3;
input and output transmission lines each having terminal ends in communication with the plurality of taps the input and output transmission lines having first and second characteristic impedances, respectively; and
first and second termination impedances provided in the terminal ends of the input and output transmission lines, respectively, the first and second termination impedances being mismatched with respect to the first and second characteristic impedances respectively, to create, by way of reflection through the delay sections due to the mismatched first and second termination impedances, n−1 additional signal paths and n−1 corresponding emulated taps to produce a reflective AFIR filter with 2n−1 effective tap delays.

13. A method of constructing a distributed analog finite impulse response (AFIR) filter circuit comprising:
providing a plurality of taps including delay sections, the plurality of taps comprising n taps where n is a positive integer greater than or equal to 2;
providing input and output transmission lines each having terminal ends in communication with the plurality of taps the input and output transmission lines having first and second characteristic impedances, respectively;
providing first and second termination impedances in the terminal ends of the input and output transmission lines, respectively, the first and second termination impedances being mismatched with respect to the first and second characteristic impedances respectively; and
creating, by way of reflection through the delay sections due to the mismatched first and second impedances, n−1 additional signal paths and n−1 corresponding emulated taps to produce a reflective AFIR filter with 2n−1 effective tap delays.

14. The method of claim 13 further comprising:
providing a eliminating, by way of circuit reduction, the added n−1 taps to create a filter circuit of n effective taps.

15. The method of claim 14 wherein eliminating the added n−1 taps creates the filter circuit of n effective taps with n−1 independent coefficients.

* * * * *